Aug. 10, 1948. W. J. LEITHMANN, JR., ET AL 2,446,936
CONVEYER
Filed Feb. 11, 1947 2 Sheets-Sheet 2
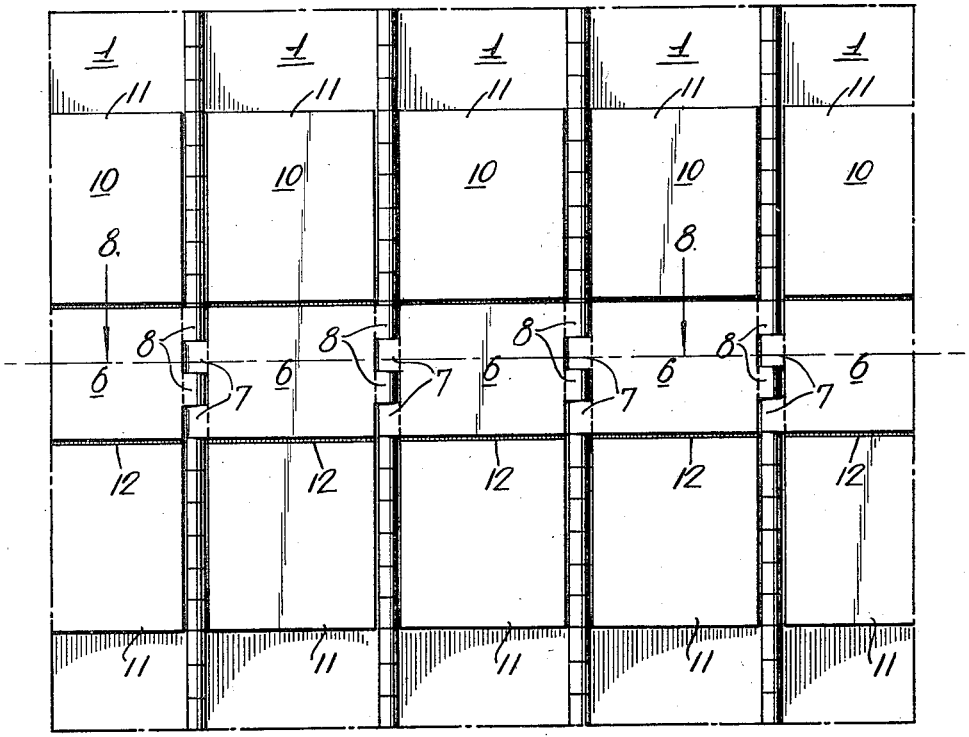
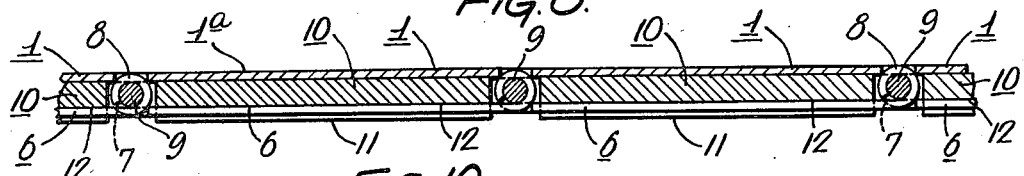
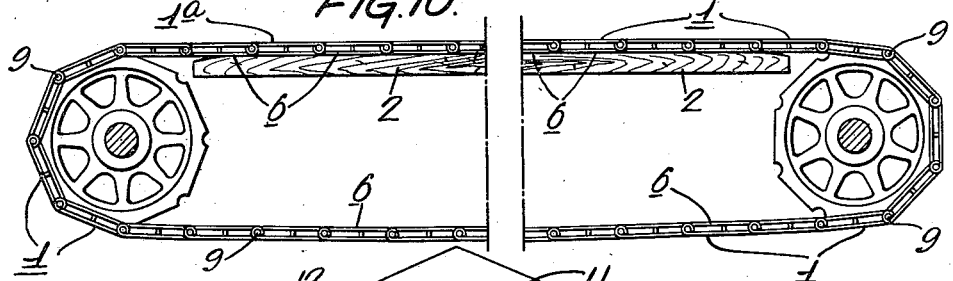
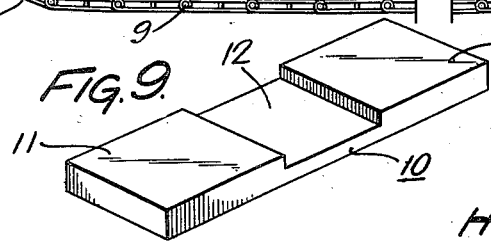
Inventors:
Warren J. Leithmann Jr.
Alpheus O. Hurxthal
by their Attorneys
Howson & Howson Patented Aug. 10, 1948

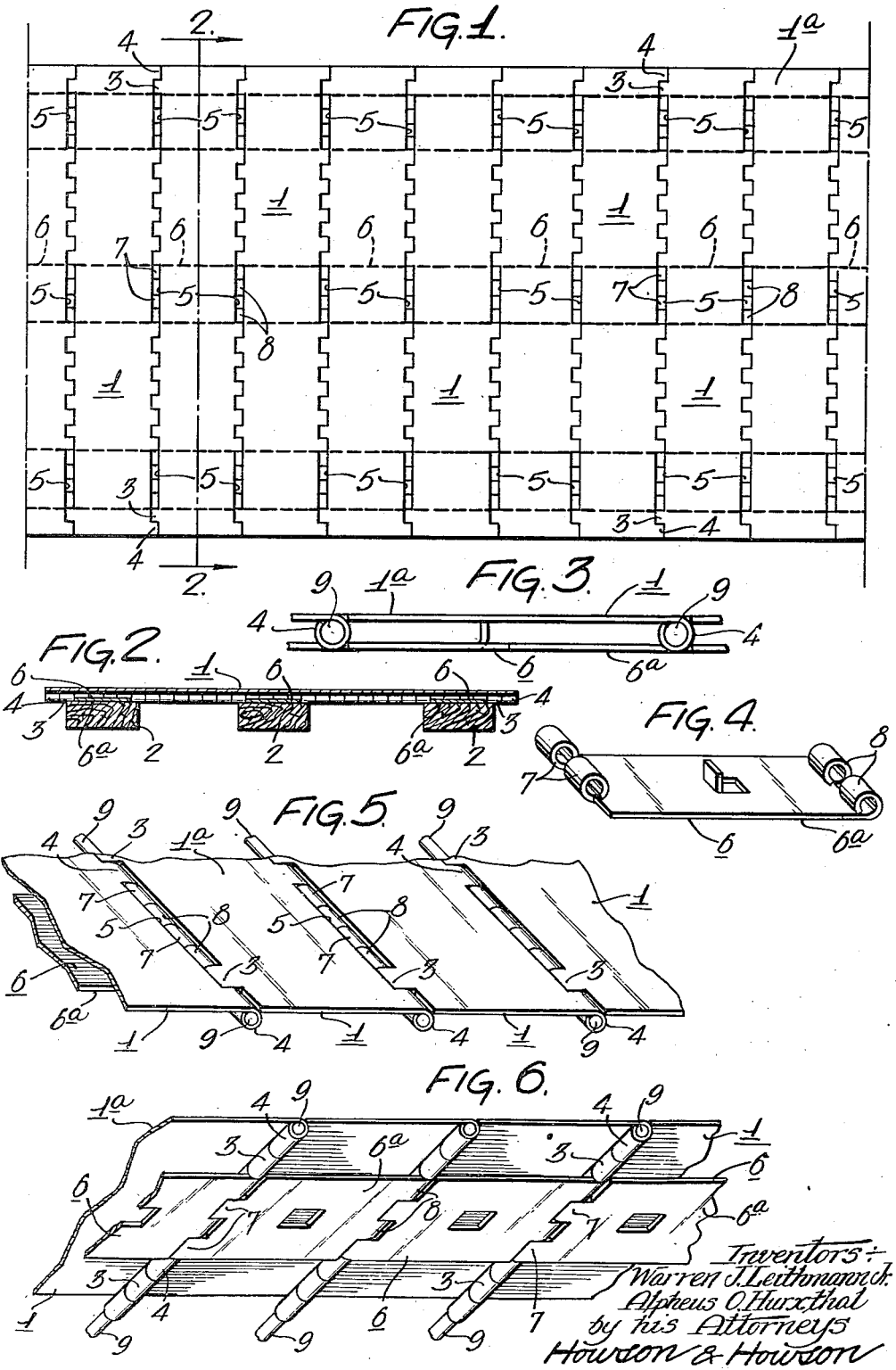

2,446,936

UNITED STATES PATENT OFFICE 2,446,936

CONVEYER

Warren J. Leithmann, Jr., Roxborough, and Alpheus O. Hurxthal, Wyncote, Pa., assignors to Proctor & Schwartz, Inc., Philadelphia, Pa., a corporation of Pennsylvania Application February 11, 1947, Serial No. 727,746

8 Claims. (Cl. 198—195)

This invention relates to new and useful improvements in conveyors, and more particularly to replaceable wear pads and plates therefor.

There has recently been developed a type of conveyor in which it is neither necessary to employ the usual side chains for carrying the conveyor nor necessary to provide the strengthening girts normally associated with conveyors. These conveyors are adapted for use with pulleys of small diameter and their aprons are composed of a succession of narrow sheet metal slats which are hingedly connected together to provide an endless articulated assembly. In installations where conveyors of this type are employed in widths which require support crosswise or transversely of the conveyor, it is customary to provide one or more support runners of wood, metal or other suitable material arranged lengthwise at the underside of the upper course of the conveyor to support the latter while in motion. This results in rubbing contact between the conveyor and runners which causes the latter to wear excessively due largely to the small surface that is presented by the hinge joint to the runner, and also causes wear of the hinge joints between adjacent slats of the conveyor.

With the foregoing in mind the principal object of the present invention is to provide a conveyor of the type described which embodies novel features of construction and arrangement operable to minimize wear of the support runners of the conveyor.

Another object of the present invention is to provide a conveyor as described having novel features of construction and arrangement operable to eliminate wear of the hinge joints between adjacent slats of the conveyor due to rubbing contact of said joints with the support runners associated with the conveyor.

A further object of the present invention is to provide a conveyor of the character set forth having detachably associated therewith replaceable wear pads embodying novel features of construction and arrangement which provide a substantially continuous smooth surface for engagement with the support runners of the conveyor so that the latter is supported with its hinge joints free from contact with the runners.

Still a further object of the invention is to provide a conveyor construction embodying the features and characteristics set forth which is of relatively simplified and rugged construction, comparatively inexpensive to manufacture, and highly efficient and effective in operation and use.

These and other objects of the invention and the various features and details of the construction, arrangement and operation thereof are hereinafter fully set forth and described with reference to the accompanying drawings, in which:

Fig. 1 is a plan view of a portion of a conveyor made according to the present invention.

Fig. 2 is a sectional view taken on line 2—2, Fig. 1.

Fig. 3 is an enlarged fragmentary side elevational view of the conveyor showing the wear pad of the present invention.

Fig. 4 is a detached perspective view of one of the wear pads showing the construction thereof.

Fig. 5 is a fragmentary perspective view of a portion of the upper side of the conveyor illustrating the construction of the hinge joints between successive conveyor slats and wear pads.

Fig. 6 is a view similar to Fig. 5 of the underside of the conveyor.

Fig. 7 is a plan view from the underside of a conveyor embodying a modified construction and arrangement of wear pads.

Fig. 8 is an enlarged sectional view taken on line 8—8, Fig. 7.

Fig. 9 is a detached view in perspective of the modified form of wear pad; and

Fig. 10 is a diagrammatic side elevational view of a conveyor installation embodying the present invention.

Referring now to the drawings, a conveyor of the type with which the present invention is concerned, includes an apron which comprises a plurality of relatively elongated narrow slats 1 of sheet metal or other suitable material which are arranged in parallel relation transversely of the conveyor and hingedly connected together to form an articulated apron or conveyor of the endless type adapted to be supported in its working course of travel by means of one or more runner members 2.

As shown in the drawings, the hinge joints between adjacent slats are provided by forming along the opposite side edges of the slats 1 a plurality of tubular hinge portions 3 and 4, respectively, which are disposed in aligned, spaced apart relation lengthwise of the slats and arranged for complementary interfitting association in alignment with the hinge portions 4 and 3, respectively, of adjacent slats 1.

With reference to Figs. 5 and 6 of the drawings, it is to be noted that the hinge portions 3 and 4 at the opposite sides of the slats 1 are offset inwardly of the conveyor in order that the supporting surfaces 1a of the slats are unobstructed and provide a substantially continuous smooth surface for material or articles to be conveyed thereon. Furthermore, in the portions of the conveyor slats 1 which overlie the support runners 2, it will be observed that a preselected number of the hinge portions 3 and 4 is omitted from the opposite side edges of adjacent slats in order to provide clearance or space 5 between adjacent slats for a purpose to be described hereinafter.

Associated with each of the slats 1 is one or more wear pads 6 depending upon the number of support runners 2 provided in a particular conveyor installation. As shown in Fig. 4 of the drawings, these wear pads 6 have tubular hinge portions 7 and 8, respectively, formed at their opposite ends and these hinge portions 7 and 8 are disposed in relatively spaced apart relation and arranged for complementary interfitting association in alignment with the hinge portions 8 and 7, respectively of adjacent pads or plates 6. These hinge portions 7 and 8 at the ends of the pads 6 are offset in a direction inwardly of the conveyor so that the outer surfaces 6a of the wear pads or plates 6 will be unobstructed and provide a substantially continuous smooth surface for sliding engagement upon the surfaces of the support runners 2.

The length of the wear pads 6 preferably corresponds to the width of the slats 1 and the spacing between the hinge portions 7 and 8 preferably is the same as the spacing between the slat hinge portions 3 and 4. The construction and arrangement of the hinge portions 7 and 8, therefore, is such that the hinge portions of adjacent wear pads 6 may be disposed in aligned cooperative association with one another and may be positioned in the clearance or space 5 provided between the adjacent slats 1, in alignment with the interfitting hinge portions 3 and 4 thereof, so that the interfitting hinge portions of adjacent slats as well as the interfitting hinge portions of adjacent wear pads 6 may be pivotally or hingedly connected together by a common or single pin element 9.

By virtue of the foregoing construction wherein the respective hinge portions of the slats 1 and wear pads 6 are offset as described and connected by a common hinge pin 9, it will be observed that the hinge connections between the adjacent slats and associated wear pads reside wholly between the outer faces of the slats and pads so that not only is a continuous smooth surface provided for the conveyance of material or articles upon the slats 1, but the outwardly facing surfaces of the wear pads 6 are entirely unobstructed and present a substantially continuous smooth surface for contact with the surface of the runners 2 of the conveyor installation.

With this arrangement it will be apparent that the hinge portions 3 and 4 of the slats 1 do not come in contact with the support runners 2 and hence all possibility of wear of the slat hinge portions due to rubbing contact with the runners 2 is entirely eliminated. In addition, the substantially continuous smooth surface presented by the wear plates 6 to the support runners 2, serves effectviely to minimize wear of the support runners 2 themselves. Furthermore, as the wear pads 6 become worn through continued usage of the conveyor, it will be apparent that they may be removed readily and easily from the conveyor merely by withdrawing the pins 9 from their hinge portions 7 and 8, and new pads 6 substituted in their stead.

A modified form of the invention is shown in Figs. 7, 8 and 9 of the drawings which may be employed to advantage particularly in conveyors of the present type adapted more or less for heavy duty work. Referring to these figures of the drawings, it will be observed that the construction and arrangement of the conveyor slats 1 and pads 6 as well as their respective hinged connections are identical to that previously illustrated and described herein. However, it is to be noted that in this form of the invention the pads 6 do not function as wear pads for the runners 2 but constitute retaining members for securing in place at the inner side of the conveyor a series of wear plates 10.

The wear plates 10 have transversely spaced quadrangular end portions 11 and these preferably have a thickness or height that is greater than the spacing of the pads 6 below the slats 1 so that the undersurfaces of the plate ends 11 project below the undersurface of the pads 6 as shown in Fig. 8 and present a substantially continuous smooth surface for contact with the support runners. In this matter the pads 6 are supported above and clear of the support runners upon which the undersurface of said ends 11 are adapted to engage so that all wear is borne by the plates 10 and not the pads 6. Intermediate their end portions 11 the plates 10 are recessed or cut-away as indicated at 12 to recieve the pads 6 in the relation shown in Figs. 7 and 8 of the drawings.

By constructing the wear plates 10 as shown and described it will be apparent that they are effectively locked in position by the pads 6 which must be disconnected from the conveyor in order to remove the plates 10 for replacement or any other purpose. However, this may be accomplished with little difficulty and the removal and replacement of the plates and pads may be effected with relative ease and facility as described.

From the foregoing it will be apparent that the present invention provides a conveyor of the character set forth embodying novel features of construction operable to minimize wear of the support runners and eliminate wear on the exterior of the hinge joints of the conveyor. The invention also provides a conveyor as described having detachably associated therewith replaceable wear pads or plates providing a substantially continuous smooth surface for engagement with the support runners of the conveyor so that the latter is supported with its hinge joints free from contact with the runners. Furthermore, the present invention provides a conveyor construction embodying the features and characteristics set forth which is of relatively simplified and rugged construction, comparatively inexpensive to manufacture, and highly efficient and effective in operation and use.

While certain embodiments of the invention have been illustrated and described herein, it is not intended to limit the invention to such disclosure, and changes and modifications may be made therein and thereto within the scope of the following claims.

We claim:

1. In a conveyor, an apron comprising a plurality of slats having aligned spaced apart hinge portions along opposite edges thereof disposed in complementary interfitting association with the hinge portions of adjacent slats, the hinge portions in preselected locations along opposite edges of the slats being omitted to provide clearance space between adjacent slats, pads associated with said slats and extending continuously about the interior of the conveyor apron, hinge portions arranged in aligned spaced apart relation at opposite edges of said pads and positioned in said clearance space in complementary interfitting association with the hinge portions of adjacent pads and in alignment with the interfitting hinge portions of the slats, and common means pivotally connecting said interfitting hinge portions of the slats and pads to provide an articulated structure.

2. In a conveyor, an apron comprising a plurality of slats having aligned spaced apart hinge portions along opposite edges thereof disposed in complementary interfitting association with the hinge portions of adjacent slats, the hinge portions in preselected locations along opposite edges of the slats being omitted to provide clearance space between adjacent slats, pads associated with said slats and extending continuously about the interior of the conveyor apron to provide a substantially continuous smooth bearing surface for the apron, hinge portions arranged in aligned spaced apart relation at opposite edges of said pads and positioned in said clearance space in complementary interfitting association with the hinge portions of adjacent pads and in alignment with the interfitting hinge portions of the slats, common means pivotally connecting said interfitting hinge portions of the slats and pads to provide an articulated structure, and support means for the conveyor in the working course of travel thereof disposed in underlying relation to the pads.

3. In a conveyor, an apron comprising a plurality of elongated narrow slats arranged in parallel relation transversely of the conveyor and having tubular hinge portions arranged in aligned spaced apart relation along opposite edges of said slats and disposed in complementary interfitting association with the hinge portions of adjacent slats, the hinge portions in preselected locations along opposite edges of the slats being omitted to provide clearance space between adjacent slats, a plurality of wear pads extending in end to end relation interiorly of the conveyor apron in the direction of travel thereof, said pads having a length corresponding to the width of the slats, tubular hinge portions arranged in aligned spaced apart relation at opposite edges of said pads and positioned in said clearance space in complementary interfitting association with the hinge portions of adjacent pads and in alignment with the interfitting hinge portions of the slats, and a pin extending axially through said interfitting hinge portions of the slats and pads to hingedly connect the same.

4. In a conveyor, an apron comprising a plurality of elongated narrow slats arranged in parallel relation transversely of the conveyor and having tubular hinge portions arranged in aligned spaced apart relation along opposite edges of said slats and disposed in complementary interfitting association with the hinge portions of adjacent slats, the hinge portions in preselected locations along opposite edges of the slats being omitted to provide clearance space between adjacent slats, a plurality of wear pads extending in end to end relation interiorly of the conveyor apron in the direction of travel thereof to provide a substantially continuous smooth bearing surface for the apron, said pads having a length corresponding to the width of the slats, tubular hinge portions arranged in aligned spaced apart relation at opposite edges of said pads and positioned in said clearance space in complementary interfitting association with the hinge portions of adjacent pads and in alignment with the interfitting hinge portions of the slats, a pin extending axially through said interfitting hinge portions of the slats and pads to hingedly connect the same, and support means for the conveyor in the working course of travel thereof disposed in underlying relation to the pads.

5. In a conveyor, an apron comprising a plurality of slats having aligned spaced apart hinge portions along opposite edges thereof disposed in complementary interfitting association with the hinge portions of adjacent slats, the hinge portions in preselected locations along opposite edges of the slats being omitted to provide clearance space between adjacent slats, pads associated with said slats and extending continuously about the interior of the conveyor apron, hinge portions arranged in aligned spaced apart relation at opposite edges of said pads and positioned in said clearance space in complementary interfitting association with the hinge portions of adjacent pads and in alignment with the interfitting hinge portions of the slats, common means pivotally connecting said interfitting hinge portions of the slats and pads to provide an articulated structure, and wear plates associated with said slats between the latter and said pads, said plates having central portions of reduced thickness receiving said pads therein to retain the plates in position and having relatively thick end portions projecting inwardly of the conveyor beyond the pads and providing a continuous series of smooth bearing surfaces for the apron.

6. In a conveyor, an apron comprising a plurality of slats having aligned spaced apart hinge portions along opposite edges thereof disposed in complementary interfitting association with the hinge portions of adjacent slats, the hinge portions in preselected locations along opposite edges of the slats being omitted to provide clearance space between adjacent slats, pads associated with said slats and extending continuously about the interior of the conveyor apron, hinge portions arranged in aligned spaced apart relation at opposite edges of said pads and positioned in said clearance space in complementary interfitting association with the hinge portions of adjacent pads and in alignment with the interfitting hinge portions of the slats, common means pivotally connecting said interfitting hinge portions of the slats and pads to provide an articulated structure, wear plates associated with said slats between the latter and said pads, said plates having central portions of reduced thickness receiving said pads therein to retain the plates in position and having relatively thick end portions projecting inwardly of the conveyor beyond the pads and providing a continuous series of smooth bearing surfaces for the apron, and support means for the conveyor in the working course of travel thereof disposed in underlying relation to the plates.

7. In a conveyor, an apron comprising a plurality of elongated narrow slats arranged in parallel relation transversely of the conveyor and having tubular hinge portions arranged in aligned spaced apart relation along opposite edges of said slats and disposed in complementary interfitting association with the hinge portions of adjacent slats, the hinge portions in preselected locations along opposite edges of the slats being omitted to provide clearance space between adjacent slats, a plurality of wear pads extending in end to end relation interiorly of the conveyor apron in the direction of travel thereof, said pads having a length corresponding to the width of the slats, tubular hinge portions arranged in aligned spaced apart relation at opposite edges of said pads and positioned in said clearance space in complementary interfitting association with the hinge portions of adjacent pads and in alignment with the interfitting hinge portions of the slats, a pin extending axially through said interfitting hinge portions of the slats and pads to hingedly connect the same, and wear plates associated with said slats between the latter and said pads, said plates having central portions of reduced thickness receiving said pads therein to retain the plates in position and having relatively thick end portions projecting inwardly of the conveyor beyond the pads and providing a continuous series of smooth bearing surfaces for the apron.

8. In a conveyor, an apron comprising a plurality of elongated narrow slats arranged in parallel relation transversely of the conveyor and having tubular hinge portions arranged in aligned spaced apart relation along opposite edges of said slats and disposed in complementary interfitting association with the hinge portions of adjacent slats, the hinge portions in preselected locations along opposite edges of the slats being omitted to provide clearance space between adjacent slats, a plurality of wear pads extending in end to end relation interiorly of the conveyor apron in the direction of travel thereof, said pads having a length corresponding to the width of the slats, tubular hinge portions arranged in aligned spaced apart relation at opposite edges of said pads and positioned in said clearance space in complementary interfitting association with the hinge portions of adjacent pads and in alignment with the interfitting hinge portions of the slats, a pin extending axially through said interfitting hinge portions of the slats and pads to hingedly connect the same, wear plates associated with said slats between the latter and said pads, said plates having central portions of reduced thickness receiving said pads therein to retain the plates in position and having relatively thick end portions projecting inwardly of the conveyor beyond the pads and providing a continuous series of smooth bearing surfaces for the apron, and support means for the conveyor in the working course of travel thereof disposed in underlying relation to the plates.

WARREN J. LEITHMANN, JR.
ALPHEUS O. HURXTHAL.